(12) United States Patent
Wu et al.

(10) Patent No.: US 10,750,537 B2
(45) Date of Patent: Aug. 18, 2020

(54) DATA TRANSMISSION METHOD AND APPARATUS

(71) Applicant: Huawei Technologies Co., Ltd., Shenzhen (CN)

(72) Inventors: Qiang Wu, Beijing (CN); Hao Sun, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 15/958,148

(22) Filed: Apr. 20, 2018

(65) Prior Publication Data

US 2018/0242356 A1    Aug. 23, 2018

Related U.S. Application Data

(63) Continuation of application No. PCT/CN2015/092437, filed on Oct. 21, 2015.

(51) Int. Cl.
*H04W 74/08* (2009.01)
*H04L 1/18* (2006.01)
*H04L 1/16* (2006.01)

(52) U.S. Cl.
CPC ........... *H04W 74/08* (2013.01); *H04L 1/1893* (2013.01); *H04L 1/1896* (2013.01); *H04L 1/1607* (2013.01)

(58) Field of Classification Search
None
See application file for complete search history.

(56) References Cited

U.S. PATENT DOCUMENTS

| 2008/0232332 A1* | 9/2008 | Kaminski | H04W 74/04 370/336 |
| 2010/0166111 A1* | 7/2010 | Park | H04L 1/1819 375/298 |

(Continued)

FOREIGN PATENT DOCUMENTS

| CN | 102098152 A | 6/2011 |
| CN | 102158972 A | 8/2011 |

(Continued)

OTHER PUBLICATIONS

ZTE, "Discussion on contention resolution of CB transmission," 3GPP TSG RAN WG2 #69, R2-101101, San Francisco, USA, Feb. 22-26, 2010, 4 pages.

(Continued)

*Primary Examiner* — Xavier S Wong
(74) *Attorney, Agent, or Firm* — Slater Matsil, LLP

(57) ABSTRACT

Embodiments provide a data transmission method and an apparatus. The method includes: determining, by a terminal device from the initial transmission resource block set by means of contention, an initial transmission resource block used by the terminal device to initially transmit to-be-transmitted data, and initially transmitting the to-be-transmitted data by using the initial transmission resource block; receiving, by the terminal device, a negative acknowledgement that is sent by the network device and that is for the to-be-transmitted data; determining, by the terminal device from the retransmission resource block set, a retransmission resource block used to retransmit the to-be-transmitted data; and retransmitting, by the terminal device, the to-be-transmitted data by using the retransmission resource block.

20 Claims, 6 Drawing Sheets

(56) References Cited

U.S. PATENT DOCUMENTS

| | | | |
|---|---|---|---|
| 2010/0290410 A1 | 11/2010 | Haartsen | |
| 2011/0292895 A1* | 12/2011 | Wager | H04L 5/0007 370/329 |
| 2012/0213192 A1* | 8/2012 | Kiyoshima | H04L 1/0009 370/330 |
| 2012/0213196 A1* | 8/2012 | Chung | H04B 1/713 370/330 |
| 2015/0207592 A1 | 7/2015 | Lee et al. | |

FOREIGN PATENT DOCUMENTS

| | | |
|---|---|---|
| CN | 102958185 A | 3/2013 |
| CN | 103313421 A | 9/2013 |

OTHER PUBLICATIONS

Mediatek et al.,"Discussion on the Retransmission of Contention-Based Transmission," 3GPP TSG-RAN WG2 #68bis, R2-100174, Valencia, Spain, Jan. 18-22, 2010, 3 pages.
Samsung, "Retransmission scheme for contention based access," 3GPP TSG-RAN2 #69bis meeting,R2-102461, Beijing, China, Apr. 12-16, 2010, 2 pages.

\* cited by examiner

DATA TRANSMISSION METHOD AND APPARATUS

CROSS-REFERENCE TO RELATED APPLICATIONS

This application is a continuation of international application No. PCT/CN2015/092437, filed on Oct. 21, 2015, the disclosure of which is hereby incorporated by reference in its entirety.

TECHNICAL FIELD

This application relates to the wireless communications field, and in particular, to a data transmission method and an apparatus.

BACKGROUND

In the near future, with further development and popularization of the mobile Internet, mobile data traffic will increase explosively. Global mobile data traffic is expected to increase by over 200 times from 2010 to 2020 and to increase by nearly 20,000 times from 2010 to 2030. In the future, a total quantity of devices connected to a global mobile communications network will reach hundreds of billions. A quantity of global mobile terminals (excluding Internet of Things devices) is expected to exceed 10 billion by 2020, and a quantity of global mobile terminals in China will exceed 2 billion. There will also be a rapid increase in a quantity of connected global Internet of Things devices, and the quantity of connected global Internet of Things devices will be nearly 100 billion by 2030, where a quantity of connected global Internet of Things devices in China will exceed 20 billion.

Currently, in a Long Term Evolution (LTE) system, uplink and downlink data scheduling is implemented by using a physical downlink control channel (PDCCH) or an enhanced physical downlink control channel (EPDCCH). In future communications, a very large quantity of connected users and a quantity of potential concurrently connected users present a challenge to a capacity of a control channel. A current LTE system is a scheduling-based uplink data transmission solution, but the capacity of the control channel is limited. When a quantity of concurrently connected users increases, a case in which a capacity of a data channel has a surplus but the capacity of the control channel is insufficient may occur, and in this case, the capacity of the control channel becomes a bottleneck of the system. Therefore, in a future evolved LTE system, optimizing overheads of the control channel will become an important tendency.

For example, one optimization tendency is that the scheduling-based uplink data transmission solution is evolved into a contention transmission-based uplink data transmission solution. In the solution, in a same contention transmission resource, a plurality of terminal devices for transmitting uplink data can directly send data without requiring uplink scheduling. A base station may distinguish data of different terminal devices by using demodulation reference signal (DMRS) sequences of the terminal devices, reducing scheduling overheads of a user. As shown in FIG. 1, time-frequency resources are classified into two types: a non-contention transmission resource and a contention transmission resource. A terminal device obtains the contention transmission resource by means of contention.

For a contention-based uplink transmission manner, when data needs to be sent, a terminal device contends for a time-frequency resource to send the data, and this is an initial transmission terminal device. If the initial transmission terminal device fails to transmit the data due to various reasons, and the base station feeds back a negative acknowledgement, the initial transmission terminal device applies for the time-frequency resource again for re-sending the data, and this is a retransmission terminal device. The contention-based uplink transmission manner can effectively alleviate a problem of the overheads of the control channel, but a retransmission conflict problem is introduced at the same time. For the retransmission terminal device, because the retransmission terminal device has experienced one failed initial transmission, the system should quickly make the retransmission terminal device successfully transmit the data as soon as possible. However, the retransmission terminal device may conflict with a potential initial transmission terminal device, and the conflict greatly reduces transmission reliability of a retransmission user in a contention transmission mode.

In conclusion, because of an inherent disadvantage of the contention-based uplink transmission manner in an existing wireless communications system, a novel data transmission method is urgently required in the art, so as to resolve a technical problem of transmission reliability in a case of proliferation of concurrently connected terminal devices.

SUMMARY

Embodiments of the present invention provide a data transmission method and an apparatus, so as to improve transmission reliability in a case of proliferation of concurrently connected terminal devices.

According to a first aspect, a data transmission method is provided and is applied to a wireless communications system, where a transmission resource in the wireless communications system includes a contention transmission resource, the contention transmission resource includes an initial transmission resource block set used to initially transmit data and a retransmission resource block set used to retransmit the data, and the initial transmission resource block set and the retransmission resource block set do not overlap. The method includes determining, by a terminal device from the initial transmission resource block set by means of contention, an initial transmission resource block used by the terminal device to initially transmit to-be-transmitted data, and initially transmitting the to-be-transmitted data by using the initial transmission resource block. The method also includes receiving, by the terminal device, a negative acknowledgement that is sent by a network device and that is for the to-be-transmitted data. The method also includes determining, by the terminal device from the retransmission resource block set, a retransmission resource block used to retransmit the to-be-transmitted data. The method also includes retransmitting, by the terminal device, the to-be-transmitted data by using the retransmission resource block.

According to the first aspect, different transmission resources are allocated to an initial transmission terminal device and a retransmission terminal device, so that a conflict between the initial transmission terminal device and the retransmission terminal device is avoided. Further, a plurality of retransmission resource blocks are configured, and a retransmission resource block that can be used by the terminal device during retransmission may be semi-statically configured by the network device. Therefore, a probability of a conflict between retransmission terminal devices is lowered by randomly selecting a retransmission resource block by the terminal device, and retransmission reliability is improved.

Optionally, with reference to the first aspect, in the method, the terminal device receives configuration information sent by the network device, where the configuration information includes information about the initial transmission resource block set and/or the retransmission resource block set.

Optionally, with reference to the first aspect, in the method, the configuration information further includes auxiliary indication resource configuration information configured by the network device for the terminal device; and the terminal device learns, according to the auxiliary indication resource configuration information, an auxiliary indication resource configured by the network device for the terminal device, and learns a retransmission resource block that can be indicated by different values of data carried in the auxiliary indication resource.

Optionally, with reference to the first aspect, in the method, the determining, by the terminal device from the retransmission resource block set, a retransmission resource block used to retransmit the to-be-transmitted data includes: receiving the data carried in the configured auxiliary indication resource by the network device, and selecting, according to a value of the data, the retransmission resource block from the retransmission resource block set for retransmission.

In this method, a plurality of retransmission resources are further configured, and an additional auxiliary indication resource is configured for the terminal device to indicate a retransmission resource allocated to the terminal device, so as to correspond to different transmission cases. The network device notifies, by using the auxiliary indication resource, the terminal device of a specific retransmission resource block selected during retransmission. Therefore, a probability of a conflict between retransmission terminal devices is further lowered by means of configuration by the network device, and retransmission reliability is improved.

Optionally, with reference to the first aspect, in the method, the configuration information further includes auxiliary indication resource configuration information configured by the network device for a terminal device group including the terminal device; and the terminal device learns, according to the auxiliary indication resource configuration information, an auxiliary indication resource configured by the network device for the terminal device, and learns a retransmission resource block that can be indicated by different values of data carried in the auxiliary indication resource, where an auxiliary indication resource of each terminal device in the terminal device group can indicate a same selectable retransmission resource block, and the selectable retransmission resource block includes at least two retransmission resource blocks in the retransmission resource block set.

Optionally, with reference to the first aspect, in the method, the determining, by the terminal device from the retransmission resource block set, a retransmission resource block used to retransmit the to-be-transmitted data includes: receiving the data carried in the configured auxiliary indication resource by the network device, and selecting the retransmission resource block from the retransmission resource block set according to a value of the data.

Optionally, with reference to the first aspect, in the method, the retransmission resource block determined by the terminal device according to the data carried in the auxiliary indication resource by the network device is different from a retransmission resource block determined by another terminal device in the same group as the terminal device according to the data carried in the auxiliary indication resource by the network device.

In this method, terminal devices are further grouped, a plurality of retransmission resources are separately configured for terminal devices in a group, and an additional auxiliary indication resource is configured for a terminal device group to indicate a retransmission resource, so as to correspond to different transmission cases. The network device notifies, by using the auxiliary indication resource, the terminal devices in the terminal device group of a specific retransmission resource selected during retransmission, and the plurality of terminal devices in the group may use different retransmission resources according to the auxiliary indication resource. Therefore, a probability of a conflict between retransmission terminal devices is further lowered by means of configuration by the network device, a quantity of used auxiliary indication resources is also reduced, and retransmission reliability is improved.

Optionally, with reference to the first aspect, in the method, the auxiliary indication resource is one or more indication resources added in a physical HARQ indicator channel resource.

According to a second aspect, a data transmission method is provided and is applied to a wireless communications system, where a transmission resource in the wireless communications system includes a contention transmission resource, the contention transmission resource includes an initial transmission resource block set used to initially transmit data and a retransmission resource block set used to retransmit the data, the initial transmission resource block set and the retransmission resource block set do not overlap. The method includes receiving, by a network device, to-be-transmitted data sent by a terminal device on an initial transmission resource block in the initial transmission resource block set. The method also includes sending, by the network device after failing to receive the to-be-transmitted data, a negative acknowledgement to the terminal device. The method also includes receiving, by the network device, the to-be-transmitted data sent by the terminal device on a retransmission resource block in the retransmission resource block set.

Optionally, with reference to the second aspect, in the method, the network device generates configuration information, and sends the configuration information to the terminal device, where the configuration information includes information about the initial transmission resource block set and/or the retransmission resource block set.

Optionally, with reference to the second aspect, in the method, the configuration information further includes auxiliary indication resource configuration information configured by the network device for the terminal device; and the auxiliary indication resource configuration information is used to notify an auxiliary indication resource configured by the network device for the terminal device, and notify a retransmission resource block that is indicated by different values of data carried in the auxiliary indication resource.

Optionally, with reference to the second aspect, in the method, after failing to receive the to-be-transmitted data, the network device sends data to the terminal device on the configured auxiliary indication resource, where the data is used to instruct the terminal device to select, according to the data, a retransmission resource block from the retransmission resource block set for retransmission.

Optionally, with reference to the second aspect, in the method, the configuration information further includes auxiliary indication resource configuration information configured by the network device for a terminal device group including the terminal device; the auxiliary indication resource configuration information is used to notify an auxiliary indication resource configured by the network device for terminal devices in the terminal device group, and notify a retransmission resource block that is indicated by different values of data carried in the auxiliary indication resource; and an auxiliary indication resource of each terminal device in the terminal device group can indicate a same selectable retransmission resource block, and the selectable retransmission resource block includes at least two retransmission resource blocks in the retransmission resource block set.

Optionally, with reference to the second aspect, in the method, after failing to receive the to-be-transmitted data, the network device sends data to the terminal device on the configured auxiliary indication resource, where the data is used to instruct the terminal devices in the terminal device group including the terminal device to select, according to the data, a retransmission transmission resource block from the retransmission transmission resource block set for retransmission.

Optionally, with reference to the second aspect, in the method, the network device sends same data on the auxiliary indication resource for all the terminal devices in the terminal device group.

Optionally, with reference to the second aspect, in the method, the auxiliary indication resource is one or more indication resources added in a PHICH resource.

Beneficial technical effects obtained according to the second aspect are the same as those in the first aspect, and details are not described again.

According to a third aspect, a terminal device is provided and is applied to a wireless communications system, where a transmission resource in the wireless communications system includes a contention transmission resource, the contention transmission resource includes an initial transmission resource block set used to initially transmit data and a retransmission resource block set used to retransmit the data, the initial transmission resource block set and the retransmission resource block set do not overlap. The terminal device includes a sending unit, a processing unit, and a receiving unit. The sending unit is configured to: initially transmit to-be-transmitted data by using an initial transmission resource block determined by the processing unit, and retransmit the to-be-transmitted data by using a retransmission resource block determined by the processing unit. The receiving unit is configured to receive a negative acknowledgement that is sent by a network device and that is for the to-be-transmitted data sent by the sending unit. The processing unit is configured to: determine, from the initial transmission resource block set by means of contention, the initial transmission resource block used to initially transmit the to-be-transmitted data, and determine, from the retransmission resource block set when the receiving unit receives the negative acknowledgement sent by the network device, the retransmission resource block used to retransmit the to-be-transmitted data.

Optionally, with reference to the third aspect, for the terminal device, the receiving unit is further configured to: receive configuration information sent by the network device, where the configuration information includes information about the initial transmission resource block set and/or the retransmission resource block set.

Optionally, with reference to the third aspect, for the terminal device, the configuration information received by the receiving unit further includes auxiliary indication resource configuration information configured by the network device for the terminal device; and the processing unit learns, according to the auxiliary indication resource configuration information received by the receiving unit, an auxiliary indication resource configured by the network device for the terminal device, and learns a retransmission resource block that can be indicated by different values of data carried in the auxiliary indication resource.

Optionally, with reference to the third aspect, for the terminal device, the receiving unit is further configured to receive the data carried in the configured auxiliary indication resource by the network device; and the determining, by the processing unit from the retransmission resource block set, the retransmission resource block used to retransmit the to-be-transmitted data includes: selecting the retransmission resource block from the retransmission resource block set according to a value of the data received by the receiving unit.

Optionally, with reference to the third aspect, for the terminal device, the configuration information received by the receiving unit further includes auxiliary indication resource configuration information configured by the network device for a terminal device group including the terminal device; and the processing unit is further configured to: learn, according to the auxiliary indication resource configuration information received by the receiving unit, an auxiliary indication resource configured by the network device for the terminal device, and learn a retransmission resource block that can be indicated by different values of data carried in the auxiliary indication resource, where an auxiliary indication resource of each terminal device in the terminal device group can indicate a same selectable retransmission resource block, and the selectable retransmission resource block includes at least two retransmission resource blocks in the retransmission resource block set.

Optionally, with reference to the third aspect, for the terminal device, the receiving unit is further configured to receive the data carried in the configured auxiliary indication resource by the network device; and the determining, by the processing unit from the retransmission resource block set, the retransmission resource block used to retransmit the to-be-transmitted data includes: selecting the retransmission resource block from the retransmission resource block set according to a value of the data received by the receiving unit.

Optionally, with reference to the third aspect, for the terminal device, the retransmission resource block determined by the processing unit according to the data carried in the auxiliary indication resource by the network device is different from a retransmission resource block determined by another terminal device in the same group as the terminal device according to the data carried in the auxiliary indication resource by the network device.

Optionally, with reference to the third aspect, for the terminal device, the auxiliary indication resource is one or more indication resources added in a PHICH resource.

The third aspect of the embodiments of the present invention is corresponding to the first aspect, and beneficial technical effects obtained according to the third aspect are the same as those in the first aspect, and details are not described again.

According to a fourth aspect, a network device is provided and is applied to a wireless communications system, where a transmission resource in the wireless communications system includes a contention transmission resource, the contention transmission resource includes an initial transmission resource block set used to initially transmit data and a retransmission resource block set used to retransmit the data, and the initial transmission resource block set and the retransmission resource block set do not overlap. The network device includes a receiving unit, configured to: receive to-be-transmitted data initially transmitted by a terminal device on an initial transmission resource block in the initial transmission resource block set, and after a sending unit sends a negative acknowledgement for the to-be-transmitted data to the terminal device, receive the to-be-transmitted data retransmitted by the terminal device on a retransmission resource block in the retransmission resource block set. The network device also includes a processing unit, configured to: after determining that the receiving unit fails to receive the to-be-transmitted data, generate a negative acknowledgement, and transmit the negative acknowledgement to the sending unit. The network device also includes the sending unit, configured to send the negative acknowledgement to the terminal device.

Optionally, with reference to the fourth aspect, for the network device, the processing unit is further configured to: generate configuration information, and send the configuration information to the sending unit, where the configuration information includes information about the initial transmission resource block set and/or the retransmission resource block set; and the sending unit is further configured to send the configuration information to the terminal device.

Optionally, with reference to the fourth aspect, for the network device, the configuration information generated by the processing unit further includes auxiliary indication resource configuration information configured by the network device for the terminal device; and the auxiliary indication resource configuration information is used to notify an auxiliary indication resource configured by the network device for the terminal device, and notify a retransmission resource block that can be indicated by different values of data carried in the auxiliary indication resource.

Optionally, with reference to the fourth aspect, for the network device, the processing unit is further configured to: generate data after determining that the receiving unit fails to receive the to-be-transmitted data, and transmit the data to the sending unit, where the data is used by the terminal device to select, according to the data, a retransmission resource block from the retransmission resource block set for retransmission. The sending unit is further configured to send, on the configured auxiliary indication resource, the data generated by the processing unit to the terminal device.

Optionally, with reference to the fourth aspect, for the network device, the configuration information generated by the processing unit further includes auxiliary indication resource configuration information configured by the network device for a terminal device group including the terminal device; and the auxiliary indication resource configuration information is used to notify an auxiliary indication resource configured by the network device for the terminal device, and notify a retransmission resource block that can be indicated by different values of data carried in the auxiliary indication resource, where an auxiliary indication resource of each terminal device in the terminal device group can indicate a same selectable retransmission resource block, and the selectable retransmission resource block includes at least two retransmission resource blocks in the retransmission resource block set.

Optionally, with reference to the fourth aspect, for the network device, the processing unit is further configured to: generate data after determining that the receiving unit fails to receive the to-be-transmitted data, and transmit the data to the sending unit, where the data is used to instruct the terminal device to select, according to the data, a retransmission resource block from the retransmission resource block set for retransmission; and the sending unit is further configured to send, on the configured auxiliary indication resource, the data generated by the processing unit to the terminal device.

Optionally, with reference to the fourth aspect, for the network device, the processing unit generates same data for all terminal devices in the terminal device group.

Optionally, with reference to the fourth aspect, for the network device, the auxiliary indication resource is one or more indication resources added in a PHICH resource.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
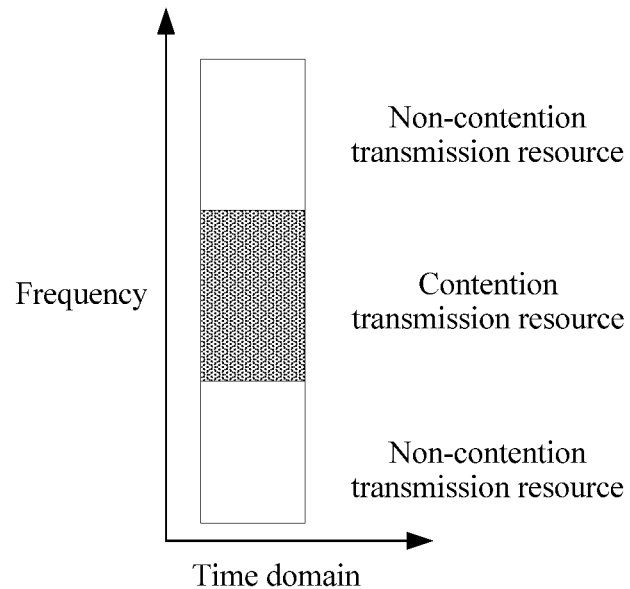
FIG. 1 is a schematic diagram of transmission resource allocation in the prior art.

Although description is given in the foregoing background by using an LTE system as an example, a person skilled in the art should understand that the present invention is applicable not only to the LTE system, but also to another wireless communications system such as a GSM, a UMTS, CDMA, and a new network system. The following describes specific embodiments by using the LTE system as an example.

Network elements related to embodiments of the present invention include a terminal device and a network device.

The terminal device is configured to: send uplink data, and receive downlink data sent by a network device.

The network device schedules transmission of the uplink data of the terminal device, receives and processes the uplink data sent by the terminal device, and schedules downlink data and sends the downlink data to the terminal device.

A person skilled in the art should understand that the terminal device in the embodiments of the present invention may be a device such as a user terminal, user equipment, or a mobile station. The network device in the embodiments of the present invention may be a device such as a base station.

Embodiment 1

A concept of this embodiment is that a network device divides a contention transmission resource into an initial transmission resource and a retransmission resource. The retransmission resource is configured as a plurality of retransmission resources, and the network device configures a corresponding retransmission resource for a terminal device.

Technical solutions in Embodiment 1 of the present invention are described below with reference to FIG. 2 and FIG. 3.

The technical solutions in this embodiment include the following steps.

Step 301: A network device generates configuration information, and sends the configuration information to a terminal device, where the configuration information includes information about an initial transmission resource block set and/or a retransmission resource block set.

Step 302: The terminal device obtains an initial transmission resource block from the initial transmission resource block set by contending with another terminal device.

Step 303: The terminal device uses the initial transmission resource block obtained by means of contention in step 302 to initially transmit to-be-transmitted data.

Step 304: The network device receives the initially transmitted data sent by the terminal device on the initial transmission resource block.

Step 305: If failing to receive the data sent by the terminal device on the initial transmission resource block in step 304, the network device sends a negative acknowledgement to the terminal device.

Step 306: After sending the to-be-transmitted data by using the initial transmission resource block in step 303, the terminal device waits to receive an acknowledgement for the transmitted data from the network device, where the acknowledgement may be a positive acknowledgement, or may be a negative acknowledgement.

Step 307: After the terminal device receives the negative acknowledgement from the network device, the terminal device learns that retransmission needs to be performed, and determines, from the retransmission resource block set, a retransmission resource block used to retransmit the to-be-transmitted data.

Step 308: The terminal device transmits the to-be-transmitted data by using the retransmission resource block determined in step 307.

Step 309: The network device receives the to-be-transmitted data sent by the terminal device on the retransmission resource block.

By using the foregoing steps, the terminal device can implement initial transmission and retransmission of the to-be-transmitted data.

Figure 2:
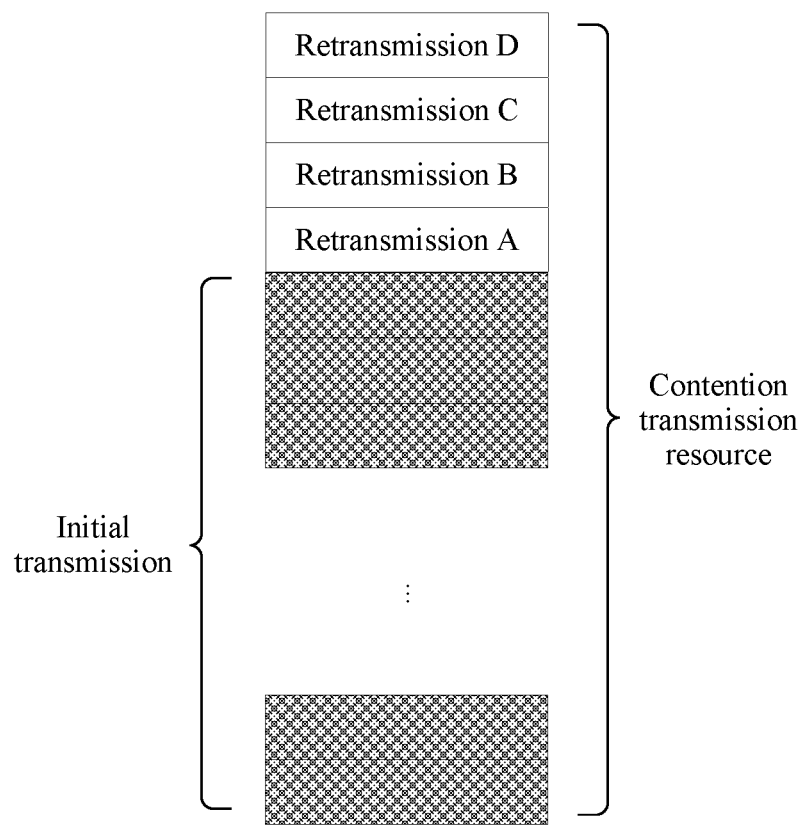
FIG. 2 is a schematic diagram of contention transmission resource allocation according to an embodiment of the present invention.
Figure 3:
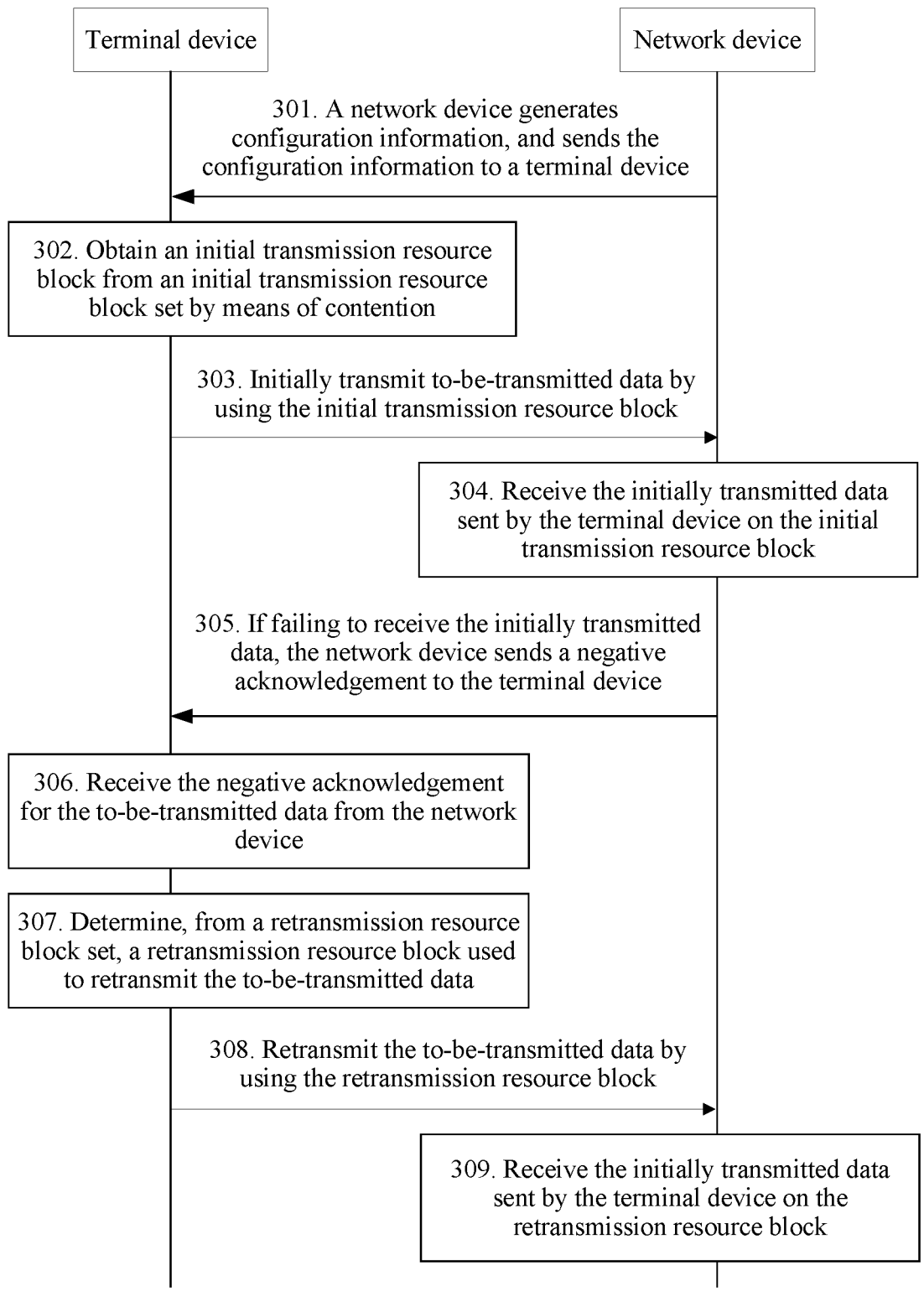
FIG. 3 is a schematic flowchart of a first data transmission method according to Embodiment 1 of the present invention.

In step 301, as shown in FIG. 2, for all contention transmission resources shown in FIG. 1, the contention transmission resources are classified into two types: an initial transmission resource block set used to initially transmit to-be-transmitted data and a retransmission resource block set used to retransmit the to-be-transmitted data. The retransmission resource block set has n retransmission resource blocks, where n is a natural number greater than 1. In the schematic diagram in FIG. 2, there are four blocks: a retransmission resource block A, a retransmission resource block B, a retransmission resource block C, and a retransmission resource block D. In actual application, there may be another quantity of retransmission resource blocks according to a specific requirement. Certainly, the initial transmission resource block set also has a plurality of initial transmission resource blocks, which are usually more than the retransmission resource blocks. A person skilled in the art may specifically adjust a quantity of initial transmission resource blocks and a quantity of retransmission resource blocks according to a specific application environment, and details are not described herein. The network device notifies, by using the configuration information, the terminal device of related information such as a resource distribution location, a quantity of resource blocks, and a size of a resource block that are of the initial transmission resource block set and the retransmission resource block set.

In the configuration information, for the information about the retransmission resource block set, the network device may notify the terminal device of all retransmission resource blocks, or may only need to notify a retransmission resource block set that can be used only by the terminal device. The network device may configure one or more retransmission resource blocks from the n retransmission resource blocks for the terminal device, and the one or more retransmission resource blocks constitute the retransmission resource block set in the configuration information. The configuration is specific to the terminal device. For example, for a terminal device 1, the network device configures, for the terminal device 1 by using the configuration information, that the retransmission resource block set includes the retransmission resource block A; for a terminal device 2, the network device configures, for the terminal device 2 by using the configuration information, that the retransmission resource block set includes the retransmission resource block B, and so on.

Optionally, a time at which the network device sends the configuration information to the terminal device may be in an access phase of the terminal device.

Optionally, step 301 may be omitted in actual application. The information about the initial transmission resource block set and the retransmission resource block set is built into the network device and the terminal device, and therefore no additional configuration steps are required.

In step 302, when there is to-be-transmitted data, the terminal device needs to obtain a transmission resource for transmission. When transmitting the to-be-transmitted data for the first time, all terminal devices may obtain an initial transmission resource block by means of contention.

Optionally, when there is step 301, the initial transmission resource block set that can be selected by the terminal device is configured according to the configuration information sent by the network device.

In step 305, in actual application, the initially transmitted data of the terminal device may fail to be transmitted due to various reasons. If the network device cannot receive the foregoing data, the network device needs to feed back the negative acknowledgement to the terminal device.

Optionally, the network device feeds back the negative acknowledgement to the terminal device by using a physical HARQ indicator channel (PHICH). If successfully receiving the data, the network device feeds back an ACK; if failing to receive the data, the network device feeds back a NACK; if detecting no data, the network device feeds back no acknowledgement.

In step 307, optionally, when there are a plurality of selectable retransmission resource blocks in the retransmission resource block set of the terminal device, the terminal device may select any one of the retransmission resource blocks for use voluntarily.

In step 309, if only one retransmission resource block is configured in the retransmission resource block set of the terminal device, after the network device sends the negative acknowledgement for the initially transmitted data to the terminal device in step 305, the network device only needs to detect retransmitted data of the terminal device in the retransmission resource block of the terminal device in step 309. If a plurality of retransmission resource blocks are configured in the retransmission resource block set of the terminal device, because the terminal device selects one of the plurality of retransmission resource blocks for use voluntarily in step 307, the network device does not know which retransmission resource block is used by the terminal device. Therefore, the network device needs to perform detection and receiving on all possible retransmission resource blocks in step 309.

In addition, in step 309, the network device may fail to receive the data. In this case, step 307 and subsequent steps may be further repeated, so that the terminal device can successfully send the to-be-transmitted data as soon as possible by using the retransmission resource block.

Because retransmission of different terminal devices is a random event in terms of probability, a conflict that may occur when all terminal devices use the retransmission resource block is also random. Therefore, a conflict of using the retransmission resource block by the terminal device during retransmission is randomized, and retransmission reliability is improved.

According to the foregoing manner in Embodiment 1, different transmission resources are allocated to an initial transmission terminal device and a retransmission terminal device, so that a conflict between the initial transmission terminal device and the retransmission terminal device is avoided. Further, a plurality of retransmission resource blocks are configured, and a retransmission resource block that can be used by the terminal device during retransmission may be semi-statically configured by the network device. Therefore, a probability of a conflict between retransmission terminal devices is lowered by randomly selecting a retransmission resource block by the terminal device, and retransmission reliability is improved.

Embodiment 2

Embodiment 2 is improved on the basis of Embodiment 1. Unlike Embodiment 1 in which one retransmission resource block is allocated to a terminal device, or a plurality of retransmission resource blocks are allocated to a terminal device, and the terminal device performs auto-selection, in Embodiment 2, for a terminal device configured with a plurality of retransmission resource blocks, a network device uses data carried in an additional auxiliary indication resource to instruct the terminal device to select a specific retransmission resource block.

Figure 4:
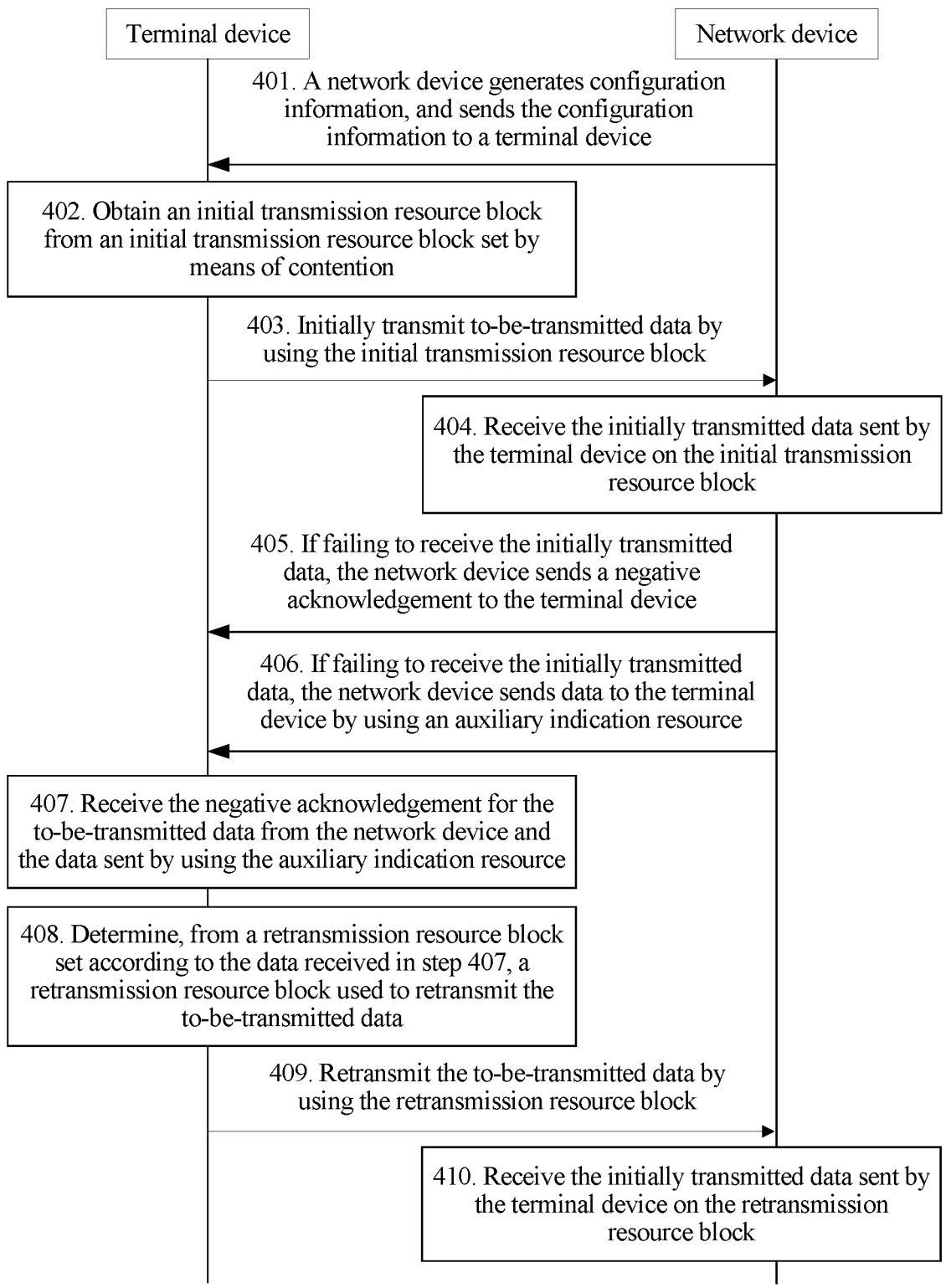
FIG. 4 is a schematic flowchart of a second data transmission method according to Embodiment 2 of the present invention.
Figure 5:
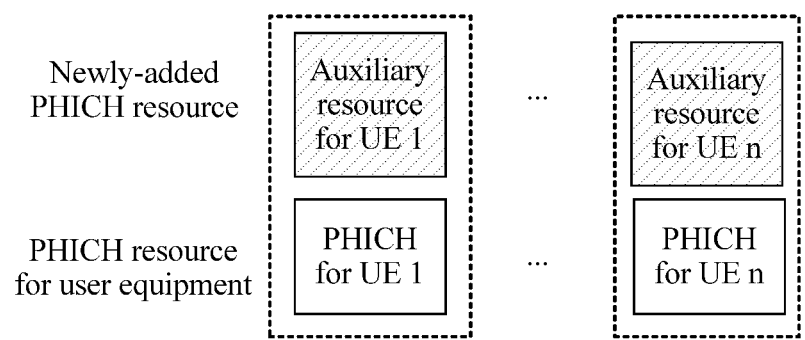
FIG. 5 is a schematic diagram of a newly-added PHICH auxiliary resource according to Embodiment 2 of the present invention.

Technical solutions in Embodiment 2 of the present invention are described below with reference to FIG. 4 and FIG. 5.

The technical solutions in this embodiment include the following steps.

Step 401: A network device generates configuration information, and sends the configuration information to a terminal device, where the configuration information includes auxiliary indication resource configuration information, information about an initial transmission resource block set, and/or information about a retransmission resource block set.

Step 402: The terminal device obtains an initial transmission resource block from the initial transmission resource block set by contending with another terminal device. This step is the same as step 302 in Embodiment 1.

Step 403: The terminal device uses the initial transmission resource block obtained by means of contention in step 402 to transmit to-be-transmitted data for the first time. This step is the same as step 303 in Embodiment 1.

Step 404: The network device receives the data sent by the terminal device on the initial transmission resource block. This step is the same as step 304 in Embodiment 1.

Step 405: If failing to receive the data sent by the terminal device on the initial transmission resource block in step 404, the network device sends a negative acknowledgement to the terminal device. This step is the same as step 305 in Embodiment 1.

Step 406: If failing to receive the data sent by the terminal device on the initial transmission resource block in step 404, the network device sends data to the terminal device by using an auxiliary indication resource.

The data is used to indicate a retransmission resource block used when the terminal device retransmits the data.

Step 407: After sending the to-be-transmitted data by using the initial transmission resource block in step 403, the terminal device waits to receive an acknowledgement for the transmitted data from the network device, where the acknowledgement may be a positive acknowledgement, or may be a negative acknowledgement.

Step 408: After the terminal device receives the negative acknowledgement from the network device, the terminal device learns that the data needs to be retransmitted, and determines, according to the data sent by the network device by using the auxiliary indication resource, a retransmission resource block used to retransmit the to-be-transmitted data from the retransmission resource block set configured by the network device.

Step 409: The terminal device transmits the to-be-transmitted data by using the retransmission resource block determined in step 408. This step is the same as step 308 in Embodiment 1.

Step 410: The network device receives the to-be-transmitted data sent by the terminal device on the retransmission resource block. This step is the same as step 309 in Embodiment 1.

In addition, in step 410, the network device may fail to receive the data. In this case, step 408 and subsequent steps may be further repeated, so that the terminal device can successfully send the to-be-transmitted data as soon as possible by using the retransmission resource block.

In Embodiment 2, steps the same as those in Embodiment 1 are not described herein again. The following describes only an improvement part in Embodiment 2 for Embodiment 1.

In step 401, division of retransmission resource blocks, the information about the initial transmission resource block set in the configuration information sent by the network device to the terminal device, and a time at which the network device sends the configuration information to the terminal device are similar to those in step 301 in Embodiment 1, and details are not described herein again.

A difference is that in step 401 in Embodiment 2, the retransmission resource block set configured by the network device for each terminal device includes a plurality of retransmission resource blocks. The network device configures m retransmission resource blocks from n retransmission resource blocks for the terminal device, and the m retransmission resource blocks are used as the retransmission resource block set of the terminal device, where m is a natural number greater than 1. For example, for a terminal device 1, the network device configures, for the terminal device 1 by using the configuration information, that the retransmission resource block set includes a retransmission resource block A and a retransmission resource block B; for a terminal device 2, the network device configures, for the terminal device 2 by using the configuration information, that the retransmission resource block set includes a retransmission resource block C and a retransmission resource block D, and so on. Certainly, the retransmission resource blocks configured by the network device for these two terminal devices may be totally different, or may overlap.

In addition, the configuration information may further include auxiliary indication resource configuration information configured by the network device for the terminal device. The auxiliary indication resource configuration information is used to notify an auxiliary indication resource configured by the network device for the terminal device, and notify a retransmission resource block that can be indicated by different values of data carried in the auxiliary indication resource.

Optionally, the auxiliary indication resource may be a physical HARQ indicator channel (PHICH) resource. Each PHICH resource carries one bit of HARQ ACK/NACK information, and the information indicates whether the network device correctly receives transmission on a physical uplink shared channel (PUSCH). To ensure that the network device can instruct the terminal device to select a specific retransmission resource block, x PHICH resources are added, where x is a natural number greater than or equal to 1. As shown in FIG. 5, adding one PHICH resource is used for description. Each terminal device uses one group of PHICH resources. Each group of PHICH resources includes a resource for feeding back one bit of ACK\NACK information by the terminal device and one newly-added PHICH resource. The newly-added PHICH resource is the auxiliary indication resource of the terminal device.

The quantity m of the retransmission resource blocks in the retransmission resource block set configured by the network device for each terminal device may be set according to a specific application case. Larger m indicates more retransmission resources that can be selected by the terminal device during retransmission and a lower probability of a conflict generated during retransmission. The quantity x of newly-added auxiliary indication resources configured by the network device for the terminal device may be set according to the quantity m, but it is required that $2^x$ be greater than or equal to m. Only when x meets the foregoing condition, can it be ensured that the network device has sufficient auxiliary indication resources to instruct the terminal device to select one retransmission resource from the m candidate retransmission resources for retransmission.

In step 406, because the network device has configured the auxiliary indication resource for the terminal device in step 401, after the network device fails to receive the initially transmitted data in step 404, the network device sends the data to the terminal device by using the auxiliary indication resource, where the data is used to instruct the terminal device to select a specific retransmission resource block from the retransmission resource block set for retransmission.

Optionally, if the auxiliary indication resource is a newly-added PHICH resource, step 405 and step 406 are completed in one step. The network device indicates acknowledgement information to the terminal device by using a default PHICH resource of the terminal device. If the data is successfully demodulated, the ACK is fed back. If the data fails to be demodulated, the NACK is fed back. If no data is detected, no acknowledgement is fed back. If the NACK needs to be fed back, the network device further needs to indicate a retransmission resource to a corresponding terminal device by using the auxiliary indication resource. Because the network device configures the x additional auxiliary indication resources for each terminal device in step 401, in step 406, the network device may instruct, by using the x auxiliary indication resources, the terminal device to select one or more specific retransmission resource blocks from the m retransmission resources for retransmission.

In a specific embodiment, if the auxiliary indication resource is a PHICH resource, a retransmission resource is specified for the terminal device according to information carried in the x newly-added auxiliary indication PHICH resources. As shown in Table 1, adding one PHICH resource is used for description. For the terminal device 1, if primary PHICH information is a NACK, and the auxiliary indication resource is 0, it indicates that the network device fails to demodulate data sent by the terminal device 1, and the terminal device 1 uses the retransmission resource block A for retransmission; if primary PHICH information is a NACK, and the auxiliary indication resource is 1, it indicates that the network device fails to demodulate data sent by the terminal device 1, and the terminal device 1 uses the retransmission resource block B for retransmission; if primary PHICH information is an ACK, it indicates that the network device successfully demodulates data sent by the terminal device 1, the terminal device 1 does not need to perform retransmission, and data transmitted on the auxiliary indication resource may be directly discarded; or if the terminal device 1 receives no acknowledgement information fed back by the network device, regardless of what a value the auxiliary indication resource is, the terminal device 1 determines that the network device skips detecting initially transmitted data of the terminal device, and in this case, the terminal device 1 still uses an initial transmission resource for next transmission, and data transmitted on the auxiliary indication resource may be directly discarded.

TABLE 1

Indicating acknowledgement information and a retransmission resource by using a PHICH resource

| | Primary PHICH (acknowledgement)/auxiliary PHICH (resource selection) | | | |
|---|---|---|---|---|
| User | N/0 | N/1 | A/x | —/x |
| Terminal device 1 | Retransmission A | Retransmission B | OK | Initial transmission |

A difference between step 408 and step 307 in Embodiment 1 is that in step 408, the data sent by the network device by using the auxiliary indication resource information needs to be further received, and a retransmission resource block is selected from the retransmission resource block set according to a value of the data for retransmission.

According to the specific embodiment in Table 1, if the terminal device receives the NACK in step 407, and the auxiliary indication resource is 0, the terminal device selects the retransmission resource block A from the retransmission resource block set; if the terminal device receives the NACK negative acknowledgement in step 407, and the auxiliary indication resource is 1, the terminal device selects the retransmission resource block B from the retransmission resource block set.

According to the foregoing manner in Embodiment 2, different transmission resources are allocated to an initial transmission terminal device and a retransmission terminal device, so that a conflict between the initial transmission terminal device and the retransmission terminal device is avoided. Further, a plurality of retransmission resources are configured, and an additional auxiliary indication resource is configured for the terminal device to indicate a retransmission resource allocated to the terminal device, so as to correspond to different transmission cases. The network device notifies, by using the auxiliary indication resource, the terminal device of a specific retransmission resource block selected during retransmission. Therefore, a probability of a conflict between retransmission terminal devices is further lowered by means of configuration by the network device, and retransmission reliability is improved.

Embodiment 3

Embodiment 3 is improved on the basis of Embodiment 2. A network device also uses data carried in an additional auxiliary indication resource to instruct a terminal device to select a retransmission resource. However, to reduce a quantity of used auxiliary indication resources, a group of terminal devices share one auxiliary indication resource.

Figure 6:
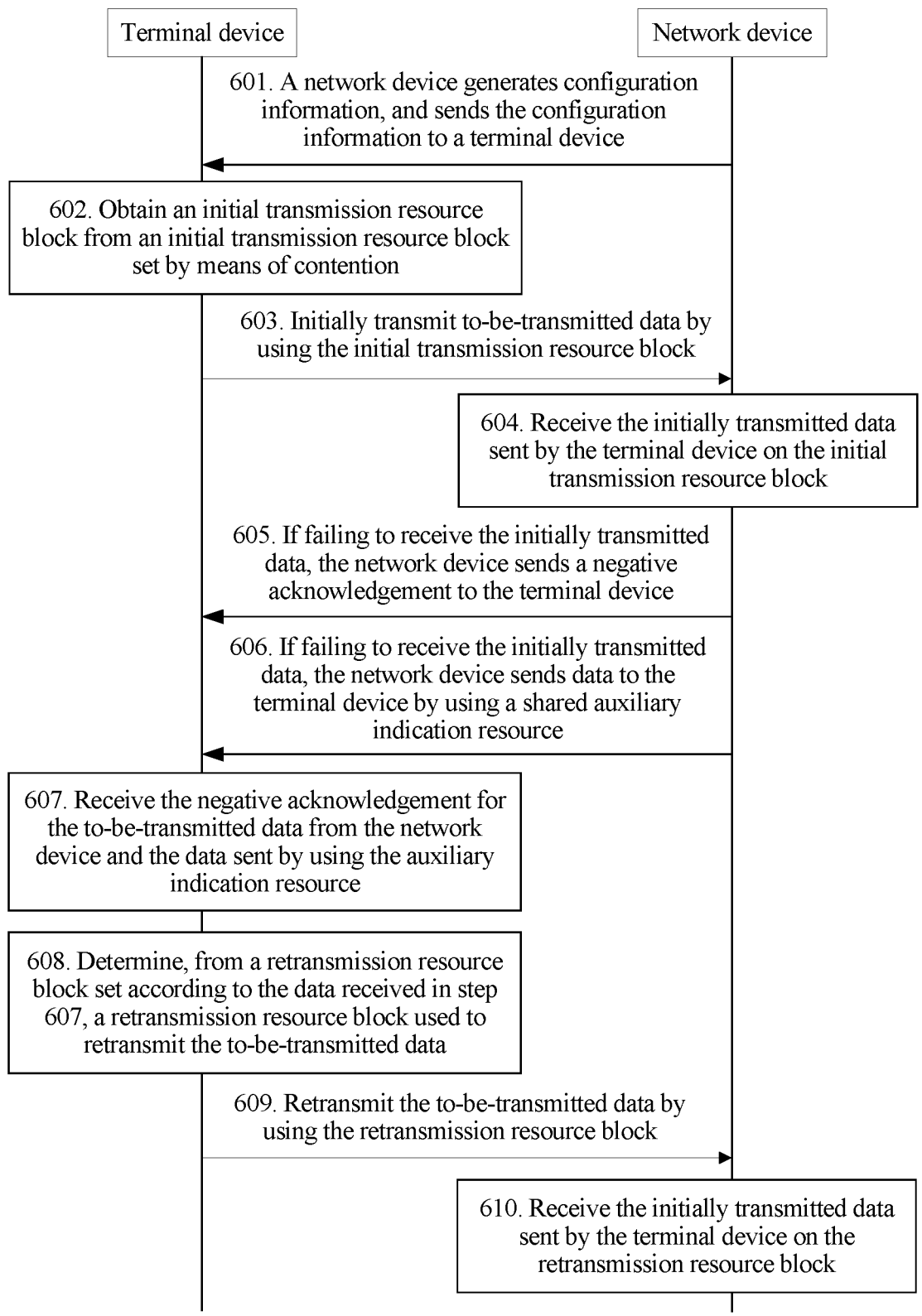
FIG. 6 is a schematic flowchart of a third data transmission method according to Embodiment 3 of the present invention.
Figure 7:
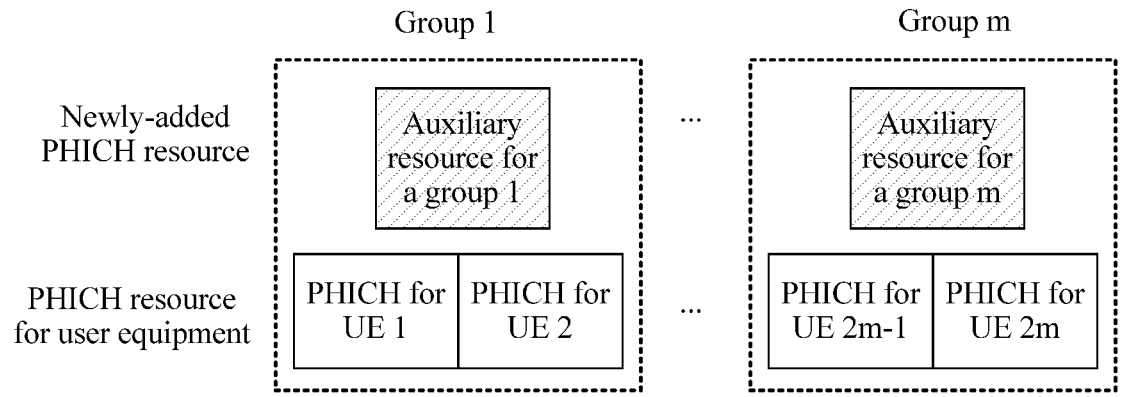
FIG. 7 is a schematic diagram of a newly-added PHICH auxiliary resource according to Embodiment 3 of the present invention.

Technical solutions in Embodiment 1 of the present invention are described below with reference to FIG. 6 and FIG. 7.

The technical solutions in this embodiment include the following steps:

Step 601: A network device generates configuration information, and sends the configuration information to a terminal device, where the configuration information includes auxiliary indication resource configuration information shared by a terminal device group, information about an initial transmission resource block set, and/or information about a retransmission resource block set.

Step 602: The terminal device obtains an initial transmission resource block from the initial transmission resource block set by contending with another terminal device. This step is the same as step 402 in Embodiment 2.

Step 603: The terminal device uses the initial transmission resource block obtained by means of contention in step 602 to transmit to-be-transmitted data for the first time. This step is the same as step 403 in Embodiment 2.

Step 604: The network device receives the data sent by the terminal device on the initial transmission resource block. This step is the same as step 404 in Embodiment 2.

Step 605: If failing to receive the data sent by the terminal device on the initial transmission resource block in step 604, the network device sends a negative acknowledgement to the terminal device. This step is the same as step 405 in Embodiment 2.

Step 606: If failing to receive the data sent by the terminal device on the initial transmission resource block in step 604, the network device sends data to the terminal device by using an auxiliary indication resource shared by the terminal device group.

Step 607: After sending the to-be-transmitted data by using the initial transmission resource block in step 603, the terminal device waits to receive an acknowledgement for the to-be-transmitted data from the network device. This step is the same as step 407 in Embodiment 2, where the acknowledgement may be a positive acknowledgement, or may be a negative acknowledgement. When the acknowledgement is a negative acknowledgement, the data sent by using the auxiliary indication resource needs to be further received.

Step 608: After the terminal device receives the negative acknowledgement from the network device, the terminal device learns that retransmission needs to be performed, and determines, according to the data sent by the network device by using the auxiliary indication resource, a retransmission resource block used to retransmit the to-be-transmitted data from the retransmission resource block set. This step is the same as step 408 in Embodiment 2.

Step 609: The terminal device transmits the to-be-transmitted data by using the retransmission resource block determined in step 608. This step is the same as step 409 in Embodiment 2.

Step 610: The network device receives the to-be-transmitted data sent by the terminal device on the retransmission resource block. This step is the same as step 410 in Embodiment 2.

In addition, in step 610, the network device may fail to receive the data. In this case, step 608 and subsequent steps may be further repeated, so that the terminal device can successfully send the to-be-transmitted data as soon as possible by using the retransmission resource block.

In Embodiment 3, steps the same as those in Embodiment 2 are not described herein again. The following describes only an improvement part in Embodiment 3 for Embodiment 2.

In step 601, division of retransmission resource blocks, the information about the initial transmission resource block set and the retransmission resource block set in the configuration information sent by the network device to the terminal device, and a time at which the network device sends the configuration information to the terminal device are similar to those in step 401 in Embodiment 2, and details are not described herein again.

A difference is that in step 601 in Embodiment 3, in an access phase or another phase of the terminal device, the network device groups terminal devices. Each terminal device group includes y terminal devices, where y is a natural number greater than or equal to 2. Specifically, each terminal device group may include two to five different terminal devices. The network device allocates m' determined retransmission resource blocks from n retransmission resource blocks to all terminal devices in a terminal device group, and the m' determined retransmission resource blocks are used as a candidate retransmission resource for the terminal devices in the group, where m' is a natural number less than n. For the y terminal devices in each group, the network device allocates same retransmission resources to the y terminal devices. For example, a terminal device group 1 includes two terminal devices: a terminal device 1 and a terminal device 2. For the terminal device 1 and the terminal device 2 in the group, the network device may configure two same resource blocks for the two terminal devices, that is, a retransmission resource block A and a retransmission resource block B, which are used as retransmission resources of the two terminal devices.

In addition, the configuration information further includes the auxiliary indication resource configuration information configured by the network device for the terminal device group. The auxiliary indication resource configuration information is used to notify an auxiliary indication resource configured by the network device for all the terminal devices in the terminal device group, and notify a retransmission resource block that can be indicated by different values of the data carried in the auxiliary indication resource. Optionally, the network device sends same data on the auxiliary indication resource to all the terminal devices in the terminal device group. In addition, the retransmission resource block determined by the terminal device according to the data carried in the auxiliary indication resource by the network device is different from a retransmission resource block determined by another terminal device in the same group as the terminal device according to the data carried in the auxiliary indication resource by the network device.

In a specific embodiment, the auxiliary indication resource may be a physical HARQ indicator channel (PHICH) resource. To ensure that the network device can instruct the terminal device how to select a retransmission resource, x' PHICH resources are added, where x' is a positive integer greater than or equal to 1. As shown in FIG. 7, an example in which one PHICH resource is added and each group of terminal devices includes two terminal devices is used as an example for description. Each group of terminal devices uses one group of PHICH resources, and each group of PHICH resources includes two PHICH resources for feeding back ACK/NACK information by the terminal device and one newly-added PHICH resource. The one newly-added PHICH resource is the auxiliary indication resource of the terminal device group.

The quantity m' of the candidate retransmission resources configured by the network device for each terminal device group may be set according to a specific application case. Larger m' indicates more retransmission resources that can be selected by terminal devices in a same terminal device group during retransmission and a lower probability of a conflict generated during retransmission. The quantity x' of newly-added auxiliary indication resources configured by the network device for the terminal device group may be set according to the quantity m', but it is required that $2^{x'}$ be greater than or equal to m'. Only when x' meets the foregoing condition, can it be ensured that the network device has sufficient auxiliary indication resources to instruct the terminal device to select one retransmission resource from the m' candidate retransmission resources for retransmission.

In step 606, because the network device has configured the auxiliary indication resource for the terminal device in the terminal device group in step 601, after the network device fails to receive the initially transmitted data in step 604, the network device sends the data to the terminal device by using the auxiliary indication resource shared by the terminal device group, where the data is used to instruct the terminal device to select a specific retransmission resource block from the retransmission resource block set for retransmission.

Similar to Embodiment 2, if the auxiliary indication resource is a newly-added PHICH resource, step 605 and step 606 can also be completed in one step. The network device indicates acknowledgement information to the terminal device by using a default PHICH resource of the terminal device. If the data is successfully demodulated, the ACK is fed back. If the data fails to be demodulated, the NACK is fed back. If no data is detected, no acknowledgement is fed back. If the NACK needs to be fed back, the network device further needs to indicate a retransmission resource to a corresponding terminal device by using the auxiliary indication resource. Because the network device configures the x' additional auxiliary indication resources for each terminal device group in step 601, in step 606, the network device may instruct, by using the x' auxiliary indication resources, the terminal device to select one or more specific retransmission resource blocks from the m' retransmission resource blocks for retransmission.

In a specific embodiment, if the auxiliary indication resource is a PHICH resource, a retransmission resource is specified for the terminal device according to information carried in the x' newly-added auxiliary indication PHICH resources. As shown in Table 2, adding one PHICH resource is used for description. For example, for the terminal device 1 in the group 1, if primary PHICH information for the terminal device 1 is a NACK, and the auxiliary indication resource is 0, it indicates that the network device fails to demodulate data sent by the terminal device 1, and the terminal device 1 performs retransmission by using the retransmission resource block A. Correspondingly, for the terminal device 2 in the group 1, if primary PHICH information for the terminal device 2 is a NACK, and the auxiliary indication resource is 0, it indicates that the network device fails to demodulate data sent by the terminal device 2, and in this case, different from the terminal device 1, the terminal device 2 performs retransmission by using the retransmission resource block B. If primary PHICH information for the terminal device 1 is a NACK, and the auxiliary indication resource is 1, it indicates that the network device fails to demodulate data sent by the terminal device 1, and the terminal device 1 performs retransmission by using the retransmission resource block B; if primary PHICH information for the terminal device 2 is a NACK, and the auxiliary indication resource is 1, it indicates that the network device fails to demodulate data sent by the terminal device 2, and in this case, different from the terminal device 1, the terminal device 2 performs retransmission by using the retransmission resource block A. If primary PHICH information for the terminal device 1 or the terminal device 2 is an ACK, it indicates that the network device successfully demodulates data sent by the terminal device 1 or the terminal device 2. Therefore, the terminal device 1 or 2 does not need to perform retransmission, and the data transmitted on the auxiliary indication resource may be directly discarded. If the terminal device 1 or the terminal device 2 receives no acknowledgement information fed back by the network device, the terminal device 1 or the terminal device 2 determines that the network device skips detecting the initially transmitted data of the terminal device, and in this case, the terminal device 1 or the terminal device 2 still uses the initial transmission resource for next transmission, and the data transmitted on the auxiliary indication resource may be directly discarded.

TABLE 2

Indicating acknowledgement information and a retransmission resource by using a shared PHICH resource

| | Primary PHICH (acknowledgement)/auxiliary PHICH (resource selection) | | | |
|---|---|---|---|---|
| Group 1 | N/0 | N/1 | A/x | —/x |
| Terminal device 1 | Retransmission A | Retransmission B | OK | Initial transmission |
| Terminal device 2 | Retransmission B | Retransmission A | OK | Initial transmission |

In step 608, according to the specific embodiment in Table 2, if the terminal device 1 receives the NACK negative acknowledgement in step 607, and the auxiliary indication resource is 0, the terminal device 1 selects the retransmission resource block A from the retransmission resource block set; if the terminal device 1 receives the NACK negative acknowledgement in step 607, and the auxiliary indication resource is 1, the terminal device 1 selects the retransmission resource block B from the retransmission resource block set. For the terminal device 2 in the same group as the terminal device 1, in a same indication, the terminal device 2 selects a retransmission resource block different from that selected by the terminal device 1.

According to the foregoing manner in Embodiment 3, different transmission resources are allocated to an initial transmission terminal device and a retransmission terminal device, so that a conflict between the initial transmission terminal device and the retransmission terminal device is avoided. Further, the terminal devices are grouped, a plurality of retransmission resources are separately configured for the terminal devices in the group, and an additional auxiliary indication resource is configured for the terminal device group to indicate a retransmission resource, so as to correspond to different transmission cases. The network device notifies, by using the auxiliary indication resource, the terminal devices in the terminal device group of a specific retransmission resource selected during retransmission, and the plurality of terminal devices in the group may use different retransmission resources according to the auxiliary indication resource. Therefore, a probability of a conflict between retransmission terminal devices is further lowered by means of configuration by the network device, a quantity of used auxiliary indication resources is also reduced, and retransmission reliability is improved.

Embodiment 4

Embodiment 4 is corresponding to Embodiment 1, and a terminal device and a network device that perform the data transmission method in Embodiment 1 are included.

Technical solutions in Embodiment 1 of the present invention are described below with reference to FIG. 8 and FIG. 9.

Figure 8:
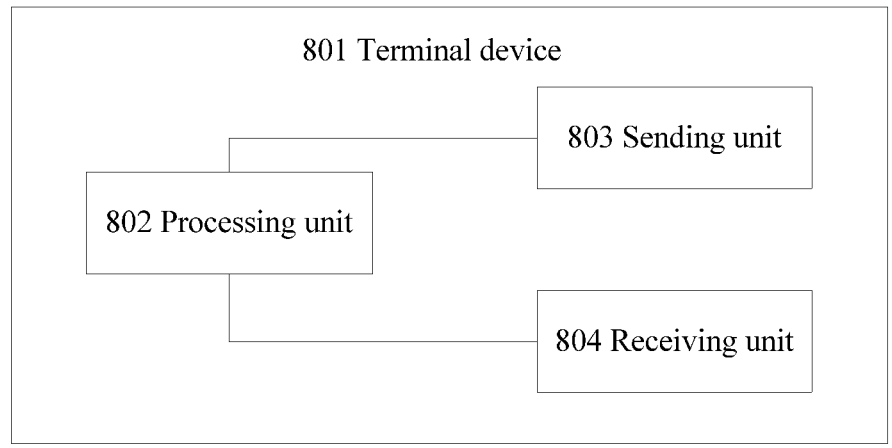
FIG. 8 is a schematic structural diagram of a terminal device according to an embodiment of the present invention.

As shown in FIG. 8, a terminal device 801 described in this embodiment of this application includes the following components: a processing unit 802, a sending unit 803, and a receiving unit 804.

Figure 9:
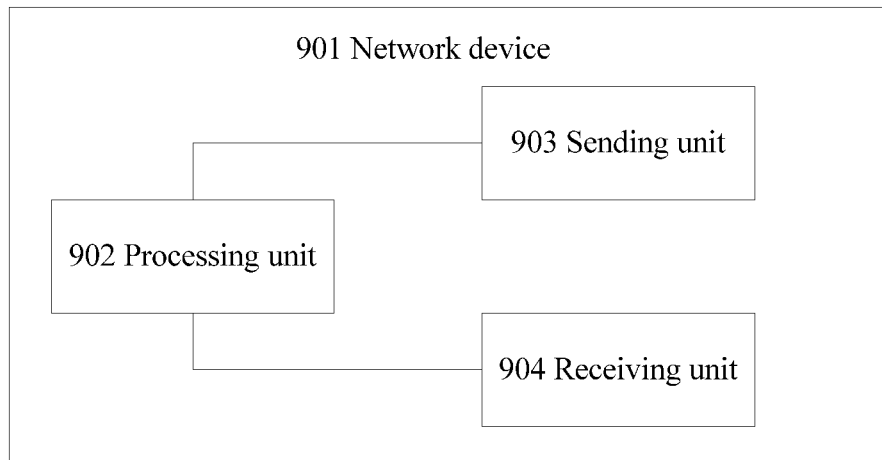
FIG. 9 is a schematic structural diagram of a network device according to an embodiment of the present invention.

As shown in FIG. 9, a network device 901 described in this embodiment of this application includes a processing unit 902, a sending unit 903, and a receiving unit 904.

A person skilled in the art should understand that the terminal device 801 and the network device 901 should further include another necessary component required for implementing communication functions of the terminal device 801 and the network device 901, such as a power supply unit. However, the foregoing component is independent of the present invention, and details are not described herein.

The processing unit 902 of the network device 901 generates configuration information, and sends the configuration information to the sending unit 903, where the configuration information includes information about an initial transmission resource block set and/or a retransmission resource block set; and the sending unit 903 is configured to send the configuration information to the terminal device. The receiving unit 804 of the terminal device 801 receives the configuration information sent by the network device 901, and transmits the configuration information to the processing unit 802, so that the terminal device 801 learns the initial transmission resource block set and/or the retransmission resource block set configured by the network device 901 for the terminal device 801. Classification of contention resources, content and meaning of the configuration information, and a time of sending the configuration information are all the same as those in step 301 in Embodiment 1, and details are not described herein again. In addition, similar to step 301 in Embodiment 1, the step in which the network device generates and transmits the configuration information may be omitted in actual application. The information about the initial transmission resource block set and the retransmission resource block set is built into the network device and the terminal device, and therefore no additional configuration steps are required.

When the terminal device 801 needs to send to-be-transmitted data to the network device 901, the terminal device 801 needs to obtain a transmission resource for transmission. When transmitting the to-be-transmitted data for the first time, all terminal devices may obtain an initial transmission resource block by means of contention. The processing unit 802 of the terminal device 801 determines, from the initial transmission resource block set by means of contention, the initial transmission resource block used to initially transmit the to-be-transmitted data. Optionally, the initial transmission resource block set that can be selected by the terminal device 801 is configured according to the configuration information sent by the network device 901.

After the processing unit 802 of the terminal device 801 determines the initial transmission resource block by means of contention, the sending unit 803 sends the to-be-transmitted data by using the initial transmission resource block.

The receiving unit 904 of the network device 901 receives the to-be-transmitted data sent by the terminal device 801 on the initial transmission resource block. In actual application, the to-be-transmitted data sent by the terminal device 801 by using the sending unit 803 may fail to be transmitted due to various reasons. If the processing unit 902 of the network device 901 determines that the receiving unit 904 fails to receive the to-be-transmitted data, the processing unit 902 generates a negative acknowledgement, and transmits the negative acknowledgement to the sending unit 903. The sending unit 903 sends the negative acknowledgement to the terminal device 801. Similar to step 305 in Embodiment 1, optionally, the network device 901 feeds back the negative acknowledgement to the terminal device by using a physical HARQ indicator channel PHICH. If successfully receiving the data, the network device 901 feeds back an ACK; if failing to receive the data, the network device 901 feeds back a NACK; if detecting no data, the network device 901 feeds back no acknowledgement.

After the terminal device 801 sends the to-be-transmitted data by using the initial transmission resource block, the receiving unit 804 waits to receive the negative acknowledgement that is sent by the network device 901 and that is for the to-be-transmitted data sent by the sending unit 803.

When the receiving unit 804 of the terminal device 801 receives the negative acknowledgement from the network device 901, the processing unit 802 of the terminal device 801 learns that retransmission needs to be performed, and determines, from the retransmission resource block set, a retransmission resource block used to retransmit the to-be-transmitted data. When there are a plurality of selectable retransmission resource blocks in the retransmission resource block set of the terminal device 801, the processing unit 802 may select any one of the retransmission resource blocks voluntarily.

The sending unit 803 of the terminal device 801 retransmits the to-be-transmitted data by using the retransmission resource block determined by the processing unit 802.

The receiving unit 904 of the network device 901 receives the to-be-transmitted data sent by the terminal device 801 on the retransmission resource block. A processing manner in a case in which one or more retransmission resource blocks are configured in the retransmission resource block set of the terminal device is the same as that in step 309 in Embodiment 1, and details are not described herein again.

Same as Embodiment 1, in Embodiment 4, a conflict that may occur when all terminal devices use a retransmission resource block is random, so that a conflict of using the retransmission resource block by the terminal device during retransmission is randomized, and retransmission reliability is improved. Obtained beneficial technical effects are also totally the same as those in Embodiment 1, and details are not described.

Embodiment 5

Embodiment 5 is improved on the basis of Embodiment 4, and a terminal device and a network device that perform the data transmission method in Embodiment 2 are included. Unlike Embodiment 4 in which one retransmission resource block is allocated to a terminal device, or a plurality of retransmission resource blocks are allocated to a terminal device, and the terminal device performs auto-selection, in Embodiment 5, for a terminal device configured with a plurality of retransmission resource blocks, a network device uses data carried in an additional auxiliary indication resource to instruct the terminal device to select a specific retransmission resource block.

Technical solutions in Embodiment 5 of the present invention are described below with reference to FIG. 8 and FIG. 9. Components included in a terminal device 801 and a network device 901 in Embodiment 5 of this application are totally the same as those in Embodiment 4, and details are not described again.

Similar to a relationship between Embodiment 2 for describing a method and Embodiment 1 for describing a method, operations of the terminal device and the network device in Embodiment 5 for describing an apparatus are largely the same as those in Embodiment 4 for describing an apparatus. For same parts in Embodiment 5 and Embodiment 4, details are not described herein again. The following describes only an improvement part in Embodiment 5 for Embodiment 4.

A difference from Embodiment 4 is that in an operation in which a processing unit 902 of the network device 901 generates configuration information and sends the configuration information to a sending unit 903, a retransmission resource block set configured by the processing unit 902 for each terminal device includes a plurality of retransmission resource blocks. In addition, the configuration information further includes auxiliary indication resource configuration information configured by the network device 901 for the terminal device 801. The auxiliary indication resource configuration information is used to notify an auxiliary indication resource configured by the network device 901 for the terminal device 801, and notify a retransmission resource block that can be indicated by different values of data carried in the auxiliary indication resource. A receiving unit 804 of the terminal device 801 receives the configuration information sent by the network device 901, and transmits the configuration information to a processing unit 802, so that the terminal device 801 learns the retransmission resource block that can be indicated by the different values of the data carried in the auxiliary indication resource. A case in which the processing unit 902 configures the retransmission resource block set for each terminal device, a case in which the auxiliary indication resource may be a PHICH resource, and a quantity of retransmission resource blocks in the retransmission resource block set configured by the network device for each terminal device are totally the same as those in step 401 in Embodiment 2, and details are not described again.

A difference from Embodiment 4 is that if the processing unit 902 of the network device 901 determines that a receiving unit 904 fails to receive to-be-transmitted data transmitted by the terminal device 801 by using an initial transmission resource block, the processing unit 902 further generates data used to instruct the terminal device 801 to select a retransmission resource block from the retransmission resource block set for retransmission, and transmits the data to the sending unit 903. The sending unit 903 is further configured to send, on the configured auxiliary indication resource, the data generated by the processing unit 902 to the terminal device 801. If the auxiliary indication resource is a newly-added PHICH resource, two operations in which the sending unit 903 of the network device 901 sends a negative acknowledgement and sends the data to the terminal device 801 by using the auxiliary indication resource may be completed in one step. The operations in which the network device 901 sends acknowledgement information to the terminal device by using the PHICH resource and sends the data to the terminal device 801 by using the auxiliary indication resource are the same as those in steps 405 and 406 in Embodiment 2, and details are not described again.

The receiving unit 804 of the terminal device 801 is further configured to receive the data carried in the configured auxiliary indication resource by the network device 901. The processing unit 802 of the terminal device 801 selects, according to a value of the data received by the receiving unit 804, a retransmission resource block from the retransmission resource block set for retransmission. The sending unit 803 of the terminal device 801 retransmits the to-be-transmitted data to the network device 901 by using the retransmission resource block, and the receiving unit 904 of the network device 901 receives the retransmitted to-be-transmitted data. A specific operation in which the processing unit 802 of the terminal device 801 selects, according to the value of the data received by the receiving unit 804, the retransmission resource block from the retransmission resource block set for retransmission is totally the same as that in step 408 in Embodiment 2, and details are not described again.

Beneficial technical effects obtained in Embodiment 5 are the same as those in Embodiment 2, and details are not described again.

Embodiment 6

Embodiment 6 is improved on the basis of Embodiment 5, and a terminal device and a network device that perform the data transmission method in Embodiment 3 are included. Like Embodiment 5, in Embodiment 6, data carried in an additional auxiliary indication resource is used to instruct a terminal device to select a retransmission resource. However, to reduce a quantity of used auxiliary indication resources, a group of terminal devices share one auxiliary indication resource.

Technical solutions in Embodiment 6 of the present invention are described below with reference to FIG. 8 and FIG. 9. Components included in a terminal device 801 and a network device 901 in Embodiment 6 of this application are totally the same as those in Embodiment 5, and details are not described again.

Similar to a relationship between Embodiment 3 for describing a method and Embodiment 2 for describing a method, operations of the terminal device and the network device in Embodiment 6 for describing an apparatus are largely the same as those in Embodiment 5 for describing an apparatus. For same parts in Embodiment 6 and Embodiment 5, details are not described herein again. The following describes only an improvement part in Embodiment 6 for Embodiment 5.

A difference from Embodiment 5 is that in an operation in which a processing unit 902 of the network device 901 generates configuration information and sends the configuration information to a sending unit 903, the processing unit 902 groups terminal devices. Each terminal device group includes y terminal devices, where y is a natural number greater than or equal to 2. A retransmission resource block set configured by the processing unit for each terminal device in the terminal device group includes a plurality of retransmission resource blocks, and all terminal devices in the terminal device group have a plurality of same retransmission resource blocks. In addition, the configuration information further includes auxiliary indication resource configuration information configured by the network device 901 for a terminal device group including the terminal device 801. The auxiliary indication resource configuration information is used to notify an auxiliary indication resource configured by the network device 901 for the terminal device 801, and notify a retransmission resource block that can be indicated by different values of data carried in the auxiliary indication resource. An auxiliary indication resource of each terminal device in the terminal device group can indicate a same selectable retransmission resource block, and the selectable retransmission resource block includes at least two retransmission resource blocks in the retransmission resource block set. A receiving unit 804 of the terminal device 801 receives the configuration information sent by the network device 901, and transmits the configuration information to a processing unit 802, so that the terminal device 801 learns the retransmission resource block that can be indicated by the different values of the data carried in the auxiliary indication resource. A case in which the processing unit 902 configures the retransmission resource block set for each terminal device in the terminal device group, a case in which the auxiliary indication resource may be a PHICH resource, and a quantity of retransmission resource blocks in the retransmission resource block set configured by the network device for each terminal device group are totally the same as those in step 601 in Embodiment 3, and details are not described again.

A difference from Embodiment 5 is that if the processing unit 902 of the network device 901 determines that a receiving unit 904 fails to receive to-be-transmitted data transmitted by the terminal device 801 by using an initial transmission resource block, the processing unit 902 further generates data used to instruct the terminal device 801 to select a retransmission resource block from the retransmission resource block set for retransmission, and the processing unit 902 generates same data for all terminal devices in the terminal device group, and transmits the data to the sending unit 903. The sending unit 903 is further configured to send, on the configured auxiliary indication resource, the data generated by the processing unit 902 to the terminal device 801. If the auxiliary indication resource is a newly-added PHICH resource, two operations in which the sending unit 903 of the network device 901 sends a negative acknowledgement and sends the data to the terminal device 801 by using the auxiliary indication resource may be completed in one step. The operations in which the network device 901 sends acknowledgement information to the terminal device by using the PHICH resource and sends the data to the terminal device 801 by using the auxiliary indication resource are the same as those in steps 605 and 606 in Embodiment 3, and details are not described again.

The receiving unit 804 of the terminal device 801 is further configured to receive the data carried in the configured auxiliary indication resource by the network device 901. The processing unit 802 of the terminal device 801 selects, according to a value of the data received by the receiving unit 804, a retransmission resource block from the retransmission resource block set for retransmission. The retransmission resource block determined by the processing unit 802 is different from a retransmission resource block determined by another terminal device in the same group as the terminal device 801 according to the data carried in the auxiliary indication resource by the network device 901. The sending unit 803 of the terminal device 801 retransmits the to-be-transmitted data to the network device 901 by using the retransmission resource, and the receiving unit 904 of the network device 901 receives the retransmitted to-be-transmitted data. A specific operation in which the processing unit 802 of the terminal device 801 selects, according to the value of the data received by the receiving unit 804, the retransmission resource block from the retransmission resource block set for retransmission is totally the same as that in step 608 in Embodiment 3, and details are not described again.

Beneficial technical effects obtained in Embodiment 6 are the same as those in Embodiment 3, and details are not described again.

Functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

In the several embodiments provided in this application, it should be understood that the disclosed system, apparatus, and method may be implemented in other manners. In addition, specific implementations in different embodiments may be combined on the premise that no conflict occurs. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

What is claimed is:

1. A method, comprising:
   determining, by a terminal device from an initial transmission resource block set, an initial transmission resource block to be used by the terminal device to initially transmit first data, and initially transmitting the first data using the determined initial transmission resource block, wherein the initial transmission resource block is determined using contention, wherein a transmission resource in a wireless communication system comprises a contention transmission resource, the contention transmission resource comprises the initial transmission resource block set and a retransmission resource block set, and the initial transmission resource block set is allocated for initial transmissions of data and the retransmission resource block set is allocated for retransmissions of data that was initially transmitted using the initial transmission resource block set;
   receiving, by the terminal device, a negative acknowledgement that is sent by a network device that corresponds to the transmitted first data;
   determining, by the terminal device from the retransmission resource block set, a first retransmission resource block to be used to retransmit the first data; and
   retransmitting, by the terminal device, the first data using the first retransmission resource block;
   wherein the initial transmission resource block set and the retransmission resource block set do not overlap, such that the initial transmission resource block set from which the initial transmission resource block is determined and the retransmission resource block set from which the first retransmission resource block is determined do not overlap.

2. The method according to claim 1, further comprising:
   receiving, by the terminal device, configuration information sent by the network device, wherein the configuration information comprises information about the initial transmission resource block set or the retransmission resource block set.

3. The method according to claim 2, wherein the configuration information further comprises auxiliary indication resource configuration information, the auxiliary indication resource configuration information being configured by the network device for the terminal device; and
   wherein the terminal device learns, according to the auxiliary indication resource configuration information, an auxiliary indication resource configured by the network device for the terminal device, and learns the first retransmission resource block that is indicated by a value of second data carried in the auxiliary indication resource, wherein different values of the second data carried in the auxiliary indication resource indicate different retransmission resource blocks.

4. The method according to claim 3, wherein determining, by the terminal device from the retransmission resource block set, the first retransmission resource block to be used to retransmit the first data comprises:
   receiving the second data carried in the configured auxiliary indication resource by the network device, and selecting, according to a value of the second data, the first retransmission resource block from the retransmission resource block set for retransmission.

5. The method according to claim 2, wherein the configuration information further comprises auxiliary indication resource configuration information, the auxiliary indication resource configuration information being configured by the network device for a terminal device group comprising the terminal device;
   wherein the terminal device learns, according to the auxiliary indication resource configuration information, an auxiliary indication resource configured by the network device for the terminal device, and learns the first retransmission resource block that is indicated by a value of second data carried in the auxiliary indication resource, wherein different values of the second data indicate different retransmission resource blocks; and
   wherein an auxiliary indication resource of each terminal device in the terminal device group indicates a same selectable retransmission resource block, the selectable retransmission resource block comprises at least two retransmission resource blocks in the retransmission resource block set, and the at least two retransmission resource blocks in the retransmission resource block set comprise the first retransmission resource block.

6. The method according to claim 5, wherein determining, by the terminal device from the retransmission resource block set, the first retransmission resource block to be used to retransmit the first data comprises:
   receiving the second data carried in the configured auxiliary indication resource of the terminal device, and selecting the first retransmission resource block from the retransmission resource block set according to a value of the second data.

7. A terminal device, comprising:
   a transmitter;
   a receiver;
   a processor;
   a non-transitory computer-readable storage medium storing a program to be executed by the processor, the program including instructions for:
      determining, from an initial transmission resource block set, an initial transmission resource block to be used to initially transmit first data, wherein a transmission resource in a wireless communications system comprises a contention transmission resource, the contention transmission resource comprises the initial transmission resource block set and a retransmission resource block set, and the initial transmission resource block set is allocated for initial transmissions of data and the retransmission resource block set is allocated for retransmissions of data that was initially transmitted using the initial transmission resource block set;
      transmitting, using the transmitter, the first data using the initial transmission resource block;
      receiving, using the receiver, a negative acknowledgement that is sent by a network device and that corresponds to the first data; and
      determining, from the retransmission resource block set, a first retransmission resource block to be used to retransmit the first data; and
      retransmitting, using the transmitter, the first data using the first retransmission resource block;

wherein the initial transmission resource block set and the retransmission resource block set do not overlap, such that the initial transmission resource block set from which the initial transmission resource block is determined and the retransmission resource block set from which the first retransmission resource block is determined do not overlap.

8. The terminal device according to claim 7, wherein the receiver is further configured to:
receive configuration information sent by the network device, wherein the configuration information comprises information about the initial transmission resource block set or the retransmission resource block set.

9. The terminal device according to claim 8, wherein the configuration information further comprises auxiliary indication resource configuration information, the auxiliary indication resource configuration information being configured by the network device for the terminal device; and
wherein the program further includes instructions for learning, according to the auxiliary indication resource configuration information, an auxiliary indication resource configured by the network device for the terminal device, and learning the first retransmission resource block that is indicated by a value of second data carried in the auxiliary indication resource, wherein different retransmission resource blocks are indicated by different values of the second data.

10. The terminal device according to claim 9, wherein the receiver is further configured to receive the second data carried in the configured auxiliary indication resource by the network device; and
wherein determining, from the retransmission resource block set, the first retransmission resource block to be used to retransmit the first data, comprises:
selecting the first retransmission resource block from the retransmission resource block set according to a value of the second data received by the receiver.

11. The terminal device according to claim 8, wherein the configuration information further comprises auxiliary indication resource configuration information, the auxiliary indication resource configuration information being configured by the network device for a terminal device group comprising the terminal device;
wherein the program further includes instructions for learning, according to the auxiliary indication resource configuration information, an auxiliary indication resource configured by the network device for the terminal device, and learning the first retransmission resource block that is indicated by a value of second data carried in the auxiliary indication resource, wherein different values of the second data indicate different retransmission resource blocks; and
wherein an auxiliary indication resource of each terminal device in the terminal device group indicates a same selectable retransmission resource block, the selectable retransmission resource block comprises at least two retransmission resource blocks in the retransmission resource block set, and the at least two retransmission resource blocks in the retransmission resource block set comprise the first retransmission resource block.

12. The terminal device according to claim 11, wherein the receiver is further configured to receive the second data carried in the configured auxiliary indication resource by the network device; and wherein determining, from the retransmission resource block set, the first retransmission resource block to be used to retransmit the first data comprises:
selecting the first retransmission resource block from the retransmission resource block set according to the value of the second data received by the receiver.

13. The terminal device according to claim 12, wherein the first retransmission resource block that is selected according to the value of the second data carried in the auxiliary indication resource is different from a second retransmission resource block determined by another terminal device in the same group as the terminal device, wherein the another terminal device determines the second retransmission resource block according to a value of second data carried in an auxiliary indication resource received by the another terminal device.

14. A network device, comprising:
a transmitter;
a receiver;
a processor, configured to:
attempt to receive, using the receiver, first data initially transmitted by a terminal device on an initial transmission resource block in an initial transmission resource block set, wherein a transmission resource in a wireless communications system comprises a contention transmission resource, the contention transmission resource comprises the initial transmission resource block set and a retransmission resource block set, and the initial transmission resource block set is allocated for initial transmissions of data and the retransmission resource block set is allocated for retransmissions of data that was initially transmitted using the initial transmission resource block set;
after determining that the first data has failed to be received, generate a negative acknowledgement corresponding to the first data;
transmit, using the transmitter, the negative acknowledgement to the terminal device; and
after sending the negative acknowledgement to the terminal device, receive, using the receiver, the first data that was retransmitted by the terminal device on a first retransmission resource block in the retransmission resource block set;
wherein the initial transmission resource block set and the retransmission resource block set do not overlap, such that the initial transmission resource block set that includes the initial transmission resource block on which the first data was initially transmitted by the terminal device does not overlap the retransmission resource block set that includes the first retransmission resource block on which the first data was retransmitted by the terminal device.

15. The network device according to claim 14, wherein the processor is further configured to:
generate configuration information, and send the configuration information to the transmitter, wherein the configuration information comprises information about the initial transmission resource block set or the retransmission resource block set; and
wherein the transmitter is further configured to send the configuration information to the terminal device.

16. The network device according to claim 15, wherein the configuration information further comprises auxiliary indication resource configuration information, the auxiliary indication resource configuration information being configured by the network device for the terminal device; and wherein the auxiliary indication resource configuration information indicates an auxiliary indication resource configured by the network device for the terminal device, and indicates the first retransmission resource block using a value of second data carried in the auxiliary indication resource, wherein different values of the second data indicate different retransmission resource blocks.

17. The network device according to claim 16, wherein the processor is further configured to:
    after determining that the first data has failed to be receive, generate the second data, and transmit, using the transmitter, the second data to the terminal device, wherein the second data instructs the terminal device to select, according to the second data, the first retransmission resource block from the retransmission resource block set for retransmission.

18. The network device according to claim 15, wherein the configuration information further comprises auxiliary indication resource configuration information, the auxiliary indication resource configuration information being configured by the network device for a terminal device group comprising the terminal device;
    wherein the auxiliary indication resource configuration information indicates an auxiliary indication resource configured by the network device for the terminal device, and indicates the first retransmission resource block, wherein different retransmission resource blocks are indicated by different values of second data carried in the auxiliary indication resource; and
    wherein an auxiliary indication resource of each terminal device in the terminal device group indicates a same selectable retransmission resource block, the selectable retransmission resource block comprises at least two retransmission resource blocks in the retransmission resource block set, and at least two retransmission resource blocks in the retransmission resource block set comprises the first retransmission resource block.

19. The network device according to claim 18, wherein the processor is further configured to:
    after determining that the first data has failed to be received, generate the second data, and transmit, using the transmitter, the second data to the terminal device, wherein the second data instructs the terminal device to select, according to the second data, the first retransmission resource block from the retransmission resource block set for retransmission.

20. The network device according to claim 19, wherein the processor generates same second data for all terminal devices in the terminal device group.

\* \* \* \* \*